United States Patent Office 2,718,406
Patented Sept. 20, 1955

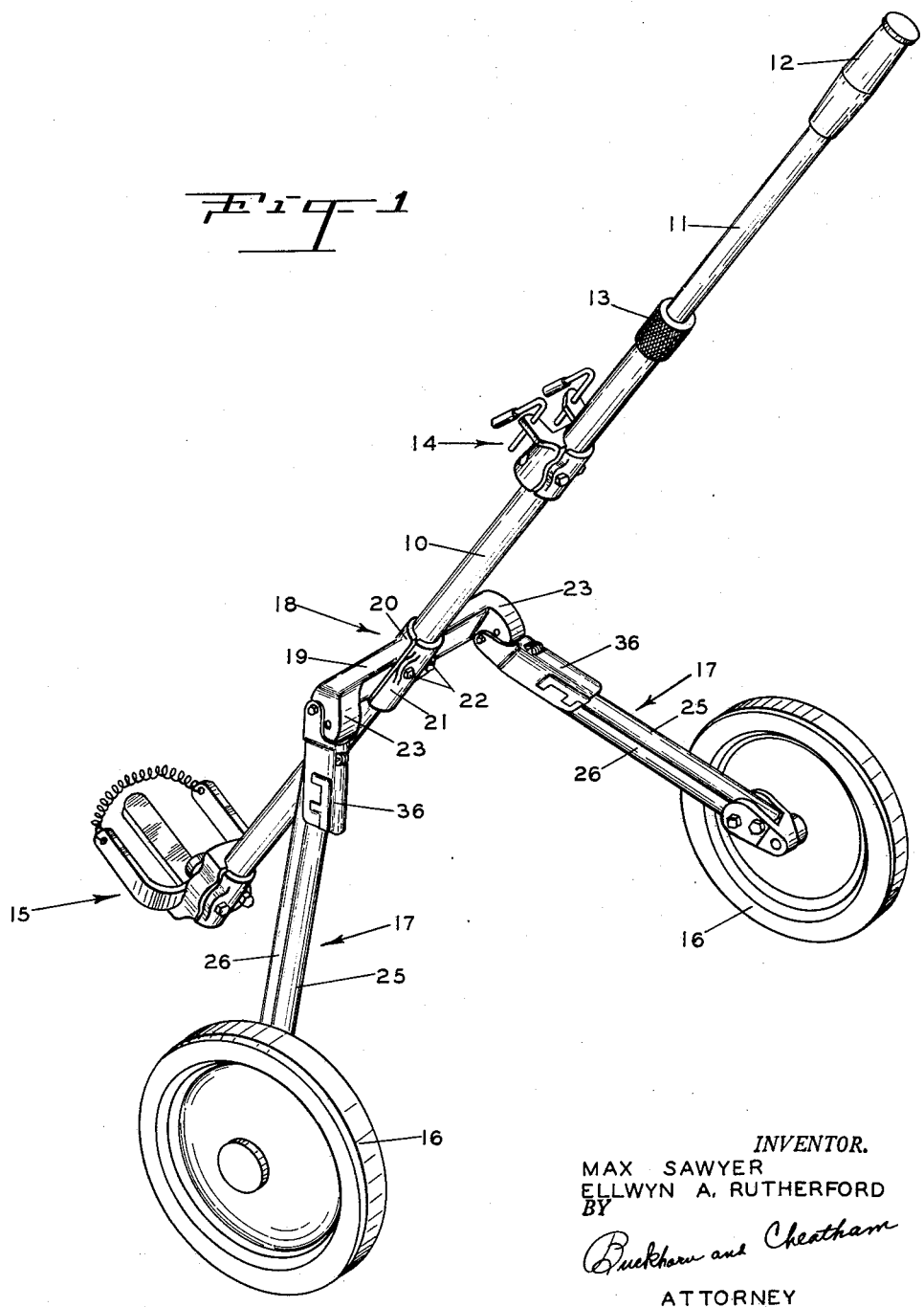

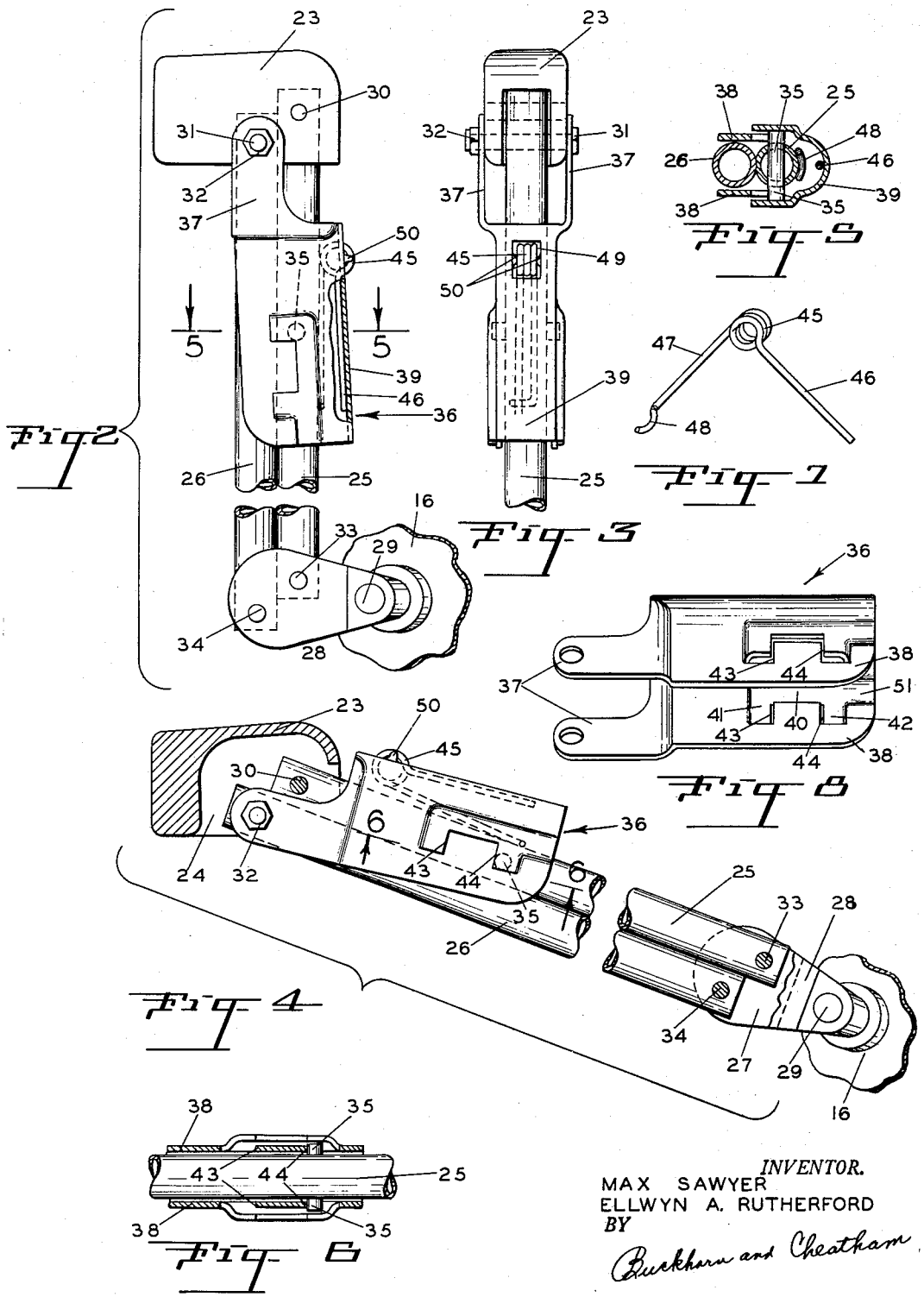

2,718,406

WHEEL MOUNTING MEANS FOR A COLLAPSIBLE CART

Max Sawyer, Portland, and Ellwyn A. Rutherford, Gladstone, Oreg.

Application March 30, 1953, Serial No. 345,608

5 Claims. (Cl. 280—41)

Our present invention relates to a wheel mounting means for a collapsible cart, such as may be used for transporting golf bags. While the invention is of particular use in golf carts for transporting golf bags, it is to be appreciated that it may be utilized in any related structure for other purposes such as baby carriages, shopping carts and the like.

The principal object of the present invention is to provide means in a structure of the foregoing character whereby the movement of a wheel mounting strut from a collapsed position to an extended position is facilitated, the latching and unlatching of the wheel strut to permit swinging movement or to maintain the wheel strut at either limit of movement being accomplished by latching means of sturdy character, formed of simple, easily fabricated and assembled parts, and which is easily manipulated. The present invention comprises an improvement upon the structure illustrated, described and claimed in our copending application, Serial No. 228,682, filed May 28, 1951, now Patent No. 2,679,402, dated May 25, 1954.

The objects and advantages of the present invention will be more readily ascertained by inspection of the accompanying drawings taken in connection with the following specification and wherein like numerals refer to like parts throughout.

In the drawings,

Fig. 1 is a view in perspective of a golf cart embodying the present invention with the wheels in extended, operative position;

Fig. 2 is a view, in side elevation, of a wheel strut embodying the present invention, with the wheel strut in collapsed position;

Fig. 3 is a front elevation of a portion of Fig. 2;

Fig. 4 is a side elevation corresponding to Fig. 2 but with the wheel strut in extended, operative position;

Fig. 5 is a horizontal section taken substantially along line 5—5 of Fig. 2;

Fig. 6 is a nearly horizontal section taken substantially along line 6—6 of Fig. 4;

Fig. 7 is a view in perspective of a spring forming part of the present invention, the spring being shown in extended condition when separated from the assembly; and Fig. 8 is a view in perspective of the latch embodied in the present invention.

The golf cart illustrated in Fig. 1 is more completely described and claimed in the above-identified copending application and comprises a body including an elongated tubular member 10, into the upper end of which is telescoped an extension 11 carrying a handle grip 12 and which is adapted to be locked in adjusted, extended position by locking means 13. A split bracket assembly 14 is mounted on the body 10 in position to engage the upper end of a golf bag, the lower end of the golf bag being retained in a split bracket assembly and supporting device 15 mounted on the lower end of the body 10. Any suitable and desired other construction may form the body of the cart.

In accordance with the present invention a pair of wheels 16 are mounted upon the body through the medium of swinging wheel struts 17 having their upper ends mounted upon a strut mounting bracket 18. In accordance with the principles disclosed in the aforementioned copending application, the strut mounting bracket comprises a transverse member 19 including a semicylindrical clamp portion 20 which is adapted to embrace the upper half of the body 10 and to be retained in desired position thereon by means of a split clamp member 21 and a pair of bolts 22. The transverse member 19 terminates in downwardly and outwardly inclined portions 23, each of which is shaped to provide a parallel-sided, downwardly facing slot 24. Each wheel strut comprises a pair of elongated structural members 25 and 26, the structural members extending parallel to each other and having their ends close together at each end of the strut. The structural members may be in the form of tubes as illustrated, in order to have a light yet sturdy construction, the external diameters of the tubes being such that the upper ends of the tubes may be closely embraced by the parallel inner surfaces of the slot 24. The lower ends of the structural members 25 and 26 extend into a parallel-sided, upwardly open slot 27 in a wheel mounting member 28 upon which there is provided a wheel spindle 29 which rotatably mounts the wheel 16. The bracket portion 23 and the wheel mounting member 28 constitute linking means which pivotally link the respective ends of the elongated structural members together to provide a parallelogram, the pivots of which are supplied by a transverse pivot pin 30 at the upper end of the member 25, a transverse bolt 31 and nut 32 at the upper end of the member 26, a transverse pin 33 at the lower end of the member 25, and a transverse pin 34 at the lower end of the member 26. The opposite ends of the transverse pins 30, 33 and 34 may be peened or tacked to rivet the pins in position, and the nut 32 is preferably of the self-locking type so that relative movement of the parts will not loosen the nut from the bolt 31. The construction, as illustrated and claimed in the above-identified copending application, is such that when the strut is in retracted or collapsed position as seen in Fig. 2, the member 25 is elevated with respect to the member 26 and when the strut is in extended position as seen in Fig. 4, the member 25 is lowered with respect to the member 26. At the center of the swinging movement of the strut the structural members will be separated from each other a slight amount and the parallelogram will then be a rectangle. The swinging movement of the strut in each direction is limited when the structural members 25 and 26 engage each other throughout their lengths as illustrated in Figs. 2 and 4. By reason of this construction the wheels 16 always remain parallel to each other so that the cart may be rolled about when collapsed or when in extended condition.

The improvement herein illustrated and claimed comprises an improvement in latching means to hold the strut in either limit position. The latching means comprises a catch consisting of a pin extending through the member 25 and suitably affixed thereto to provide a pair of oppositely extending lugs 35 lying along a line normal to the plane of swinging movement of the strut. The latch comprises an elongated U-shaped member 36 pivotally mounted for swinging movement in the plane of swinging movement of the strut, the axis of its pivot being normal to the plane of the swinging movement and intersecting the other structural member 26, for convenience the pivot of the latching member being the bolt 31 defining one of the corners of the parallelogram. The latch comprises a pair of ears 37 which straddle the bracket 23 and are provided with aligned openings to permit passage of the bolt 31. The ears 37 form extensions on the opposite side flanges 38 of the member 36, the bight portion 39 of which is curved and overlies the structural member 25. Each side flange 38 is formed in a die to provide a groove having a longitudinal portion 40 and a pair of offset, transverse notches 41 and 42 defining a pair of opposed latching abutments 43 and 44, respectively, the groove being large enough so that the lug 35 may slide therealong. As seen in Fig. 2, the relative shifting of the members forming the strut has positioned the lugs in the grooves 41 when the strut is in collapsed position, and in the grooves 42 when the strut is in extended position. The latch is urged into operative position by means of a spring including a coiled central body 45, a leg 46 and an opposed leg 47 having a transverse hook 48 at its end. The coiled body 45 is maintained in a slot 49 in the bight portion 39 of the latch, the proper position of the body being assured by means of two lugs 50 projecting upwardly from the edges of the slot and engaging the spring body. The straight leg 46 of the spring lies along the inner surface of the bight portion 39 of the latch and the other leg lies along the surface of the structural member 25, this relationship being maintained by the hook 48. The spring therefore constitutes a strong hairpin spring which is maintained in position to urge the latch into latching engagement with the catch, or in other words to urge the abutments 43 and 44 into latching engagement with the lugs 35. The construction is such that the latch may be moved to releasing position by gripping the latch and the strut, with the palm of the hand pressing against the bight of the latch and the tips of the fingers engaging the opposite surface of the structural member 26 so that the latch may be squeezed toward the structural member 25. The same operation may be accompanied by swinging movement of the wheel strut, the movement being facilitated since it does not require the use of two hands, one to swing the wheel strut and the other to manipulate a latch. Assembly of the device is facilitated by reason of an extension 51 of the groove portion 40 in longitudinal alignment with the major dimension of the latch, this extension providing means whereby the latch may be slid downwardly to engage the lugs 35 and position the apertures in ears 36 in alignment with the opening in the bracket 23 so that the bolt 31 may be inserted.

Having illustrated and described a preferred form of the present invention, it should be apparent to those skilled in the art that the same permits of modification in arrangement and detail. We claim as our invention all such modifications as come within the true spirit and scope of the appended claims.

We claim:

1. Wheel mounting means for a collapsible cart comprising a wheel mounting strut, said strut comprising a pair of elongated structural members lying side by side in parallel relation to each other, linking means pivotally linking together the adjacent ends of said structural members at each end thereof to form a parallelogram permitting limited swinging movement of said strut in a plane including the axes of both of said structural members, a catch projecting from one of said structural members, and a latch pivotally mounted for swinging movement parallel to said plane about an axis normal to said plane and adjacent the other of said structural members, said latch comprising means defining two longitudinally spaced grooves in which said catch is alternately engageable when said strut is swung to the opposed limits of its movement.

2. Wheel mounting means for a collapsible cart comprising a wheel mounting strut, said strut comprising a pair of elongated structural members lying side by side in parallel relation to each other, linking means pivotally linking together the adjacent ends of said structural members at each end thereof to form a parallelogram permitting limited swinging movement of said strut in a plane including the axes of both of said structural members, a catch projecting from one of said structural members, a latch pivotally affixed to said strut for swinging movement parallel to said plane about an axis normal to said plane and adjacent the other of said structural members, said latch comprising a portion overlying said catch and defining a longitudinally spaced pair of abutments alternately engageable by said catch when said strut is swung to the opposed limits of its movement, and spring means operatively associated with said latch to cause latching engagement of said catch with said abutments.

3. Wheel mounting means for a collapsible cart comprising a wheel mounting strut, said strut comprising a pair of elongated structural members lying side by side and parallel to each other, linking means linking together the adjacent ends of said structural members at each end of said strut to form a parallelogram permitting limited swinging movement of said strut in a plane including the axes of both of said structural members, one of said linking means comprising a bracket fixed to the cart and the other of said linking means comprising a wheel mounting member, a catch projecting from one of said elongated members, a latch pivotally mounted upon said bracket for swinging movement in said plane, the axis of pivotal movement of said latch being closer to the other structural member than the one from which said catch projects, said latch comprising a portion overlying said catch and defining a longitudinally spaced pair of abutments alternately engageable by said catch when said strut swings to the limits of its movement, and spring means interposed between said latch and said strut to urge said abutments into latching engagement with said catch.

4. Wheel mounting means for a collapsible cart comprising a wheel mounting strut, said strut comprising a pair of elongated structural members lying side by side and parallel to each other, linking means linking together the adjacent ends of said structural members at each end of said strut to form a parallelogram permitting limited swinging movement of said strut in a plane including the axes of both of said structural members, one of said linking means comprising a bracket fixed to the cart and the other of said linking means comprising a wheel mounting member, a catch projecting from one of said elongated members, a latch pivotally mounted upon said bracket at one corner of said parallelogram for swinging movement in said plane, the axis of pivotal movement of said latch being closer to the other structural member than the one from which said catch projects, said latch comprising a portion overlying said catch and defining a groove in which said catch is engaged, a wall of said groove defining a longitudinally spaced pair of abutments alternately engageable by said catch when said strut swings to the limits of its movement, and spring means interposed between said latch and said strut to urge said abutments into latching engagement with said catch.

5. Wheel mounting means for a collapsible cart comprising a wheel mounting strut, said strut comprising a pair of elongated structural members lying side by side and parallel to each other, linking means linking together the adjacent ends of said structural members at each end of said strut to form a parallelogram permitting limited swinging movement of said strut in a plane including the axes of both of said structural members, one of said linking means comprising a bracket fixed to the cart and the other of said linking means comprising a wheel mounting member, a catch projecting from one of said elongated members, a latch pivotally mounted upon said bracket at one corner of said parallelogram for swinging movement in said plane, the axis of pivotal movement of said latch being closer to the other structural member than the one from which said catch projects, said latch comprising a portion overlying said catch and defining a groove in which said catch is engaged, a wall of said groove defining a longitudinally spaced pair of abutments alternately engageable by said catch when said strut swings to the limits of its movement, and spring means interposed between said latch and said strut to urge said abutments into latching engagement with said catch, said latch comprising a channel-shaped member having its side flanges closely adjacent and overlying portions of both of said elongated members, and said spring being interposed between the bight portion of said latch and the elongated structural member from which said catch projects.

References Cited in the file of this patent

UNITED STATES PATENTS

| | | |
|---|---|---|
| 2,171,013 | Stinson | Aug. 29, 1939 |
| 2,476,718 | Foley | July 19, 1949 |
| 2,626,814 | Chamberlin | Jan. 27, 1953 |